Sept. 9, 1941.    J. BERGER ET AL    2,255,593
TUBE COUPLING
Filed Jan. 18, 1940

Inventors
J. Berger, R. Kaiser
V. Zurmühlen
By    E. A. Venn.
Agent.

Patented Sept. 9, 1941

2,255,593

UNITED STATES PATENT OFFICE 2,255,593

TUBE COUPLING

Julius Berger, Berlin-Wilhelmsruh, Rudolf Kaiser, Hohenneuendorf, near Berlin, and Willy Zurmühlen, Wandlitz, near Berlin, Germany, assignors to Michigan Patents Corporation, Jackson, Mich.

Application January 18, 1940, Serial No. 314,399
In Germany June 16, 1939

5 Claims. (Cl. 284—18)

This invention relates to a pipe coupling wherein closure valves are provided in both coupling members, the valves being held open when the coupling is closed and being closed when the parts are uncoupled.

Most of the known tube couplings have the draw-back that when the coupling parts are separated, losses of the hydraulic liquid occur. When the coupling parts are joined together air enters the coupling and moves from there into the tubes connected therewith. This has the disadvantage that the transfer of control movements by means of the hydraulic liquid is rendered practically impossible, since the air is highly compressible, in contradistinction to the hydraulic medium. Further, the known couplings have the drawback that they are very complicated and expensive in the manufacture.

We have now discovered that couplings without the drawbacks referred to can be produced in a simple manner by arranging within each of the two coupling parts a longitudinally displaceable sleeve or the like slidable member. When the coupling parts are pressed together, the sleeve is forced inwardly into its coupling part against the action of a spring. The spring presses against an abutment in the coupling member and thereby forces through the intermediary of a pin and slot connection the valve closure member, preferably a seated valve flap, into its open position. The valve is closed when the coupling is released. This closing movement of the valve flap is effected by means of the spring and with the aid of the pin and slot connection above referred to.

Preferably, the coupling is so designed that when it is closed the two valve closure members abut on each other. Further, it is advisable to construct the coupling so that the opening movements only commence when the coupling parts already abut on each other in a pressure-tight manner, and that the coupling can only be separated when the valve closure members are in their closed position.

In order to hold the coupling parts together a bayonet joint is provided. The bayonet joint is so designed that the one coupling member is surrounded by a preferably externally knurled sleeve with a slot, while the other coupling member provided with a securing flange has a bayonet stud which fits the slot.

The two coupling members may be provided with screw threads for connecting them with flexible hose.

Figure 1:
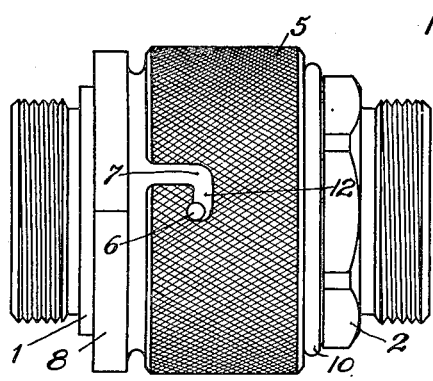
Figure 2:
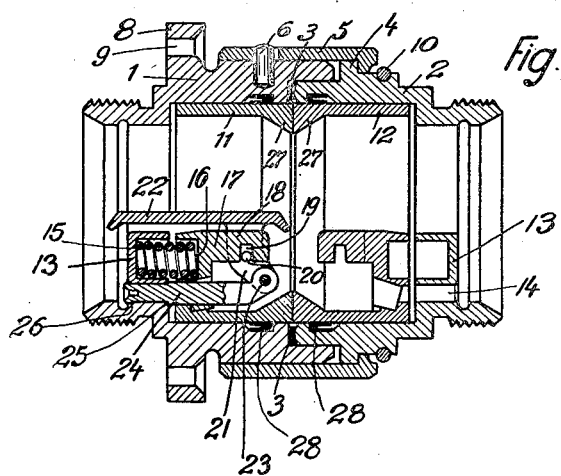

Further features of the invention will be evident from the following description of a preferred embodiment of the invention taken in connection with the accompanying drawing, in which Fig. 1 is a side elevation of a coupling according to the invention, and Fig. 2 is a longitudinal section of the coupling of Fig. 1.

Referring to the drawing, 1 and 2 are the two coupling members. The end of coupling member 1 faces the point of separation of the coupling and engages over coupling member 2 in such a manner that the latter is axially displaceable within coupling member 1. The abutment surfaces of coupling parts 1 and 2 serve as stops and limit the relation displacement of the coupling members 1 and 2. Packing 3 is provided between adjacent end faces of parts 1 and 2 and prevents the escape of liquid when the coupling is closed. Annular shoulder 4 is provided on the outer surface of coupling member 2. Sleeve 5 having a knurled outer surface engages coupling part 1 as well as coupling part 2 when the coupling is closed. Sleeve 5 is provided at its end directed towards part 2 with an inwardly directed flange which engages in a groove which, on the one hand, is formed by shoulder 4 of coupling part 2 and, on the other hand, by spring ring 10 located in a groove in part 2. Shoulder 4 and ring 10 are spaced from each other to such an extent that the flange of sleeve 5 which engages between them and thereby sleeve 5 itself can be displaced in the axial direction.

Angular bent slot 7 in sleeve 5 coacts with pin 6 which is mounted in part 1 and projects outwardly therefrom in a substantially radial direction. Pin 6 and slot 7 cooperate with each other in the manner of the known bayonet joint. Fastening flange 8 is provided on coupling member 1. Flange 8 is provided with bores 9 serving to receive fixing bolts. 11 and 12 are identical sleeves, one of which is axially slidable in coupling part 1 and the other in coupling part 2.

Since the construction of the hereinafter described valve and its actuating means is exactly the same in the case of the coupling part 1 as in the case of the coupling part 2, only one valve and its actuating means will be described. In order to show individual bearing and supporting parts more clearly, various members of the valve mechanism of coupling part 2 are not illustrated.

A cup-shaped abutment 13 is arranged in the interior of coupling part 1 as well as coupling part 2. Abutment 13 is rigidly connected to parts 1 and 2, respectively by means of walls 14. Walls 14 are provided with an opening passing therethrough, the purpose of which will be apparent hereinafter. The opening of abutment 13 faces the point of separation of the coupling and serves for receiving and as abutment for helical spring 15. The other end of spring 15 has an abutment in cavity 16 in projection 17 of axially displaceable sleeve 11 and is supported thereby. Projection 17 of sleeve 11 continues as projection 18 which extends towards the point of separation of the coupling. Slot 19 is provided in projection 18 and serves as a guide for stud 20 which coacts with slot 19 in a manner which will be subsequently described. Stud 20 is mounted in cheeks 21 of a fork rigidly mounted on valve body 22. Projection 18 engages between cheeks 21 of the fork. Cheeks 21 of the fork are mounted by means of hinge 23 on carrier 24, which in turn passes through axially displaceable sleeve 11 and is rigidly mounted on coupling part 1. The end of carrier 24 which is not connected to hinge 23 passes through the above mentioned opening formed in supporting walls 14 of cup 13. Furthermore, carrier 24 is provided with shoulders 25 and 26 bearing against adjacent faces of cup 13 or coupling part 1 and prevent more particularly any axial displacement of carrier 24.

Sleeves 11 and 12 are provided with projections 27 at their ends which face each other and which, when the coupling is closed, bear against each other. Projections 27 form valve seats cooperating with valve flaps 22.

U-section packings 28 are located in grooves in coupling parts 1 and 2 and prevent the outflow of fluid when the coupling is released.

The coupling operates as follows:

When coupling parts 1 and 2 are completely separated from each other, helical spring 15 forces valve flap 22 upon its seat through the intermediary of the pin and slot connection 19, 20. This is accomplished in the following manner. Sleeve 11 is displaced in a direction towards the point of separation of the coupling and valve flap 22 is turned positively about the axis of hinge 23 by the engagement of slot 19 with stud 20 until flap 22 bears firmly on its seat 27. Owing to the closure of flap 22, the pipe which is connected to coupling part 1 is shut off in a pressure tight manner. The closure of the pipe connected with coupling part 2 is effected in exactly the same manner.

If the coupling is to be closed, then coupling parts 1 and 2 are brought together so that their end faces bear against each other, springs 15 being gradually compressed. Simultaneously the end faces of axially displaceable sleeves 11 and 12 are forced further and further into their surrounding coupling parts 1 and 2, respectively. Due to the displacement of sleeves 11 and 12 slots 19 turn stud 20 around the axes of hinges 23 to such an extent that valve flaps 22 are thereby swung into their open position.

After valve flaps 22 have been completely opened, coupling parts 1 and 2 are held together by means of bayonet joint 6, 7.

In order to release the coupling, the procedure is such that first of all the bayonet joint 6, 7 is released, whereupon springs 15 tend to displace sleeves 11 and 12 in the direction of the point of separation of the coupling. During the displacement of sleeves 11 and 12 valve flaps 22 are swung into their closed position. After the complete and fluid-tight closure has been effected, coupling parts 1 and 2 are completely separated from each other.

What we claim is:

1. A pipe coupling comprising in combination two coupling members, a valve closure member in each of said two coupling members, a sleeve in each of said coupling members adapted to be displaced longitudinally therein and provided with a valve seat for said valve closure member, a biasing spring mounted in each of said coupling parts and urging said slidable sleeve outwards, said valve closure member being pivotally connected with said sleeve as to be pressed against its seat to close each coupling member when said sleeve moves outwards, while moving into its inoperative position when said sleeve is pressed inwards by pressing said coupling members against each other.

2. A pipe coupling comprising in combination two coupling members, a valve flap in each of said coupling members, a sleeve in each of said coupling members adapted to be slidably displaced longitudinally thereof, each of said sleeves being provided with a seat for said valve flap, a spring mounted in each of said coupling members and pressing said sleeves outwards, each of said flaps having a fork-shaped extension provided with a pin, each of said sleeves having a projection arranged between the cheeks of said fork-shaped extension, said projection having a slot engaging with the pin in said fork-shaped extension, said flaps being pressed against their seats when said sleeves are forced outwards to close each coupling member preparatory to disengaging said coupling members, while moving into their inoperative position substantially at right angles to their closed position when said sleeves are pressed inwards upon engaging said coupling members.

3. A pipe coupling comprising in combination two coupling members, a sleeve in each of said coupling members adapted to be displaced longitudinally therein and provided with a valve seat, a valve carrier secured to each of said coupling members and extending through said sleeve, a valve closure member in each of said two coupling members pivoted on said valve carrier and cooperating with said valve seat, each of said valve closure member being pivotally connected with one of said sleeves, a biasing spring mounted in each of said coupling parts and urging said slidable sleeve outwards to press said valve closure member against its seat to close each coupling member, said valve closure member moving into its inoperative position substantially at right angles to its closed position when said sleeve is pressed inwards by pressing said coupling members against each other.

4. A pipe coupling comprising in combination two coupling members, a valve flap in each of said coupling members to prevent the escape of fluid when the coupling members are disengaged, a sleeve in each of said coupling members adapted to be slidably displaced longitudinally thereof, each of said sleeves being provided with a seat for said valve flap, a cup-shaped member on each of said coupling members, another cup-shaped abutment on each of said sleeves, a spring mounted in each of said cup-shaped members and its cup-shaped abutment to press said sleeves outwards, each of said flaps having a fork-shaped extension provided with a pin, each of said sleeves having a projection arranged between the cheeks of said fork-shaped extension and having a slot engaging with the pin in said fork-shaped extension, said flaps being pressed against their seats to lie closely adjacent to each other when said sleeves are forced outwards to close each coupling member, while moving into their opening position when the opposite faces of said coupling members abut on each other.

5. A pipe coupling comprising in combination two coupling members, a valve closure member in each of said two coupling members, a sleeve in each of said coupling members adapted to be displaced longitudinally therein and provided with a valve seat for said valve closure member, a biasing spring mounted in each of said coupling parts and urging said slidable sleeve outwards, each of said valve closure members being pivotally connected with one of said sleeves as to be pressed against its seat to close each coupling member when said sleeves move outwards, said valve closure members being closely adjacent to each other when they are pressed against their seats, while moving into their opening position when the opposite faces of said coupling members abut on each other, the separation of said two coupling members being only possible when said valve closure members are in their closing position, a pin on one of said coupling members extending radially outwards therefrom, the other one of said coupling members having a sleeve rotatably mounted on the outside thereof, said outer sleeve having an angularly bent slot therein adapted to receive and lock said pin to prevent axial displacement of said coupling members with regard to each other when said pin is locked in said slot.

JULIUS BERGER.
RUDOLF KAISER.
WILLY ZURMÜHLEN.